United States Patent
Wagoner et al.

(10) Patent No.: US 11,486,360 B2
(45) Date of Patent: Nov. 1, 2022

(54) SYSTEM AND METHOD FOR CONTROLLING WIND TURBINE CONVERTERS DURING HIGH VOLTAGE RIDE THROUGH EVENTS

(71) Applicant: General Electric Company, Schenectady, NY (US)

(72) Inventors: Robert Gregory Wagoner, Roanoke, VA (US); David Scott Wilmer, Roanoke, VA (US)

(73) Assignee: General Electric Company, Schenectady, NY (US)

(*) Notice: Subject to any disclaimer, the term of this patent is extended or adjusted under 35 U.S.C. 154(b) by 273 days.

(21) Appl. No.: 16/845,447

(22) Filed: Apr. 10, 2020

(65) Prior Publication Data

US 2021/0320601 A1    Oct. 14, 2021

(51) Int. Cl.
*H02J 3/00* (2006.01)
*F03D 9/25* (2016.01)

(52) U.S. Cl.
CPC .......... *F03D 9/255* (2017.02); *H02J 3/00125* (2020.01); *H02J 2300/28* (2020.01)

(58) Field of Classification Search
CPC ............. H02J 3/000125; H02J 2300/28; H02J 3/00125; F03D 9/255
See application file for complete search history.

(56) References Cited

U.S. PATENT DOCUMENTS

| | | | |
|---|---|---|---|
| 8,093,741 B2 | 1/2012 | Ritter et al. | |
| 8,432,055 B2 | 4/2013 | Grbovic | |
| 8,471,516 B2 | 6/2013 | Wei et al. | |
| 8,520,417 B2 | 8/2013 | Erdman et al. | |
| 8,664,788 B1 | 3/2014 | Wagoner et al. | |
| 8,760,218 B2 | 6/2014 | Zhu | |
| 8,854,845 B2 | 10/2014 | Wilmot | |
| 8,922,173 B2 | 12/2014 | Wang et al. | |
| 8,975,768 B2 | 3/2015 | Wagoner et al. | |

(Continued)

FOREIGN PATENT DOCUMENTS

| | | |
|---|---|---|
| CA | 2810593 A1 | 9/2013 |
| CA | 2824204 A1 | 2/2014 |

(Continued)

OTHER PUBLICATIONS

European Search Report for EP Application No. 21166398.4, dated Aug. 26, 2021.

*Primary Examiner* — Harry R Behm
(74) *Attorney, Agent, or Firm* — Dority & Manning, P.A.

(57) ABSTRACT

A method for controlling a power converter of a wind turbine power system connected to an electrical grid. The wind turbine power system has a generator and the power converter has rotor-side converter and a line-side converter. The method includes monitoring an electrical parameter of at least one of the wind turbine power system or the electrical grid. In response to detecting a transient event in the electrical grid, the method includes temporarily disabling the line-side converter of the power converter from the electrical grid. Either during the transient event or after the transient event is over, the method includes implementing a control action for the line-side converter of the power converter. Further, the method includes enabling the line-side converter of the power converter to the electrical grid.

15 Claims, 5 Drawing Sheets

(56) References Cited

U.S. PATENT DOCUMENTS

| | | | |
|---|---|---|---|
| 9,000,734 | B2 | 4/2015 | Andresen et al. |
| 9,450,415 | B2 | 9/2016 | Larsen et al. |
| 9,458,830 | B2 | 10/2016 | Barker et al. |
| 9,513,614 | B2 | 12/2016 | Schnetzka et al. |
| 9,617,976 | B2 | 4/2017 | Edenfeld |
| 9,667,057 | B2 | 5/2017 | Roesner et al. |
| 10,199,970 | B2 | 2/2019 | Andersen et al. |
| 2007/0177314 | A1 | 8/2007 | Weng et al. |
| 2011/0140421 | A1 | 6/2011 | Scholte-Wassink |
| 2011/0295437 | A1 | 12/2011 | Lu et al. |
| 2011/0309875 | A1 | 12/2011 | Wei et al. |
| 2012/0133343 | A1* | 5/2012 | Grbovic .............. H02P 3/18 322/21 |
| 2013/0077367 | A1 | 3/2013 | Zhu et al. |
| 2014/0001759 | A1 | 1/2014 | Gupta et al. |
| 2014/0054892 | A1 | 2/2014 | Brown et al. |
| 2015/0084337 | A1 | 3/2015 | Wagoner et al. |
| 2015/0229257 | A1 | 8/2015 | Lu et al. |
| 2015/0249416 | A1 | 9/2015 | Barker |
| 2015/0311696 | A1 | 10/2015 | Zhu et al. |
| 2016/0065105 | A1 | 3/2016 | Hardwicke, Jr. et al. |
| 2016/0118786 | A1 | 4/2016 | Zhu et al. |
| 2016/0128231 | A1 | 5/2016 | Wagoner et al. |
| 2016/0146191 | A1 | 5/2016 | Berroteran Gil et al. |
| 2016/0241154 | A1 | 8/2016 | Donescu et al. |
| 2017/0257046 | A1 | 9/2017 | Schnetzka et al. |

FOREIGN PATENT DOCUMENTS

| | | | |
|---|---|---|---|
| CN | 101026301 A | | 8/2007 |
| CN | 105610183 A | * | 5/2016 |
| CN | 205265263 U | * | 5/2016 |
| CN | 108923629 A | * | 11/2018 |
| EP | 2876808 A2 | | 5/2015 |
| WO | WO2013169503 A1 | | 11/2013 |

* cited by examiner

SYSTEM AND METHOD FOR CONTROLLING WIND TURBINE CONVERTERS DURING HIGH VOLTAGE RIDE THROUGH EVENTS

FIELD

The present disclosure relates generally to wind turbines and, more particularly, to a system and method for controlling a wind turbine converter during a high voltage ride through (HVRT) event.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. Generally, during operation of a wind turbine, wind impacts the rotor blades and the blades transform wind energy into a mechanical rotational torque that drives a low-speed shaft. The low-speed shaft drives a gearbox that subsequently steps up the low rotational speed of the low-speed shaft to drive a high-speed shaft at an increased rotational speed, wherein the high-speed shaft rotatably drives a generator rotor. In many conventional wind turbine configurations, the generator is electrically coupled to a bi-directional power converter that includes a rotor-side converter (RSC) joined to a line-side converter (LSC) via a regulated DC link. The LSC converts the DC power on the DC link into AC output power that is combined with the power from the generator stator to provide multi-phase power having a frequency maintained substantially at the frequency of the electrical grid bus (e.g. 50 HZ or 60 HZ).

The above system is generally referred to as a doubly-fed induction generator (DFIG) system, whose operating principles include that the rotor windings are connected to the grid via slip rings and the power converter controls rotor current and voltage. Control of rotor voltage and current enables the generator to remain synchronized with the grid frequency while the wind turbine speed varies (e.g., rotor frequency can differ from the grid frequency). Also, the primary source of reactive power from the DFIG system is from the RSC via the generator (generator stator-side reactive power) and the LSC (generator line-side reactive power). Use of the power converter, in particular the RSC, to control the rotor current/voltage makes it is possible to adjust the reactive power (and real power) fed to the grid from the RSC independently of the rotational speed of the generator. In addition, the generator is able to import or export reactive power, which allows the system to support the grid during extreme voltage fluctuations on the grid.

Many wind turbines are arranged in a common geographical area known as a wind farm. Typically, the amount of reactive power to be supplied by a wind farm to the grid during steady-state and transient states is established by a code requirement dictated by the grid operator, wherein a wind farm controller determines the reactive power demand made on each wind turbine within the wind farm. A local controller at each wind turbine receives and allocates the reactive power demand between the generator sources (e.g., between generator-side reactive power and line-side reactive power).

Many wind turbines/wind farms are located in remote areas or areas that impose one or more grid code requirements. For example, such grid requirements may include various ride through capabilities, such as zero-voltage-ride-through, low-voltage-ride-through, or high-voltage-ride-through. Such ride through capabilities generally refers to the capability of the wind turbine generator to stay connected to the grid in short periods of zero, low, or high electric network voltage.

Thus, an improved system and method for controlling a wind turbine converter during a high voltage ride through (HVRT) event would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a method for controlling a power converter of a wind turbine power system connected to an electrical grid. The wind turbine power system has a generator and the power converter has rotor-side converter and a line-side converter. The method includes monitoring an electrical parameter of at least one of the wind turbine power system or the electrical grid. In response to detecting a transient event in the electrical grid, the method includes temporarily disabling the line-side converter of the power converter from the electrical grid. Either during the transient event or after the transient event is over, the method includes implementing a control action for the line-side converter of the power converter. Further, the method includes enabling the line-side converter of the power converter to the electrical grid.

In an embodiment, the electrical parameter of the electrical grid may include voltage, current, or any other suitable electrical parameter or combinations thereof.

In another embodiment, the method may include temporarily disabling the rotor-side converter of the power converter during the transient event in response to detecting the transient event in the electrical grid.

In further embodiments, temporarily disabling the line-side converter of the power converter from the electrical grid during the transient event may include, for example, temporarily disabling gating of switching elements of the line-side converter of the power converter via a converter controller.

In certain embodiments, the transient event may be a high voltage ride through (HVRT) event. In an embodiment, the method includes determining one or more characteristics of the HVRT event. For example, the characteristic(s) of the HVRT event may include a voltage or current magnitude, a grid characteristic, grid impedance, grid strength, a duration of the HVRT event, and/or combinations thereof.

In additional embodiments, the method may include determining the control action based on the characteristic(s) of the HVRT event. For example, in an embodiment, the control action may include adjusting a current of the line-side converter of the power converter, adjusting a phase-locked loop angle of the line-side converter of the power converter, or any other control action. Moreover, in an embodiment, adjusting the current of the line-side converter of the power converter or adjusting the phase-locked loop angle of the line-side converter of the power converter may occur before enabling the line-side converter of the power converter to the electrical grid.

In further embodiments, the generator may be a doubly fed induction generator (DFIG).

In another aspect, the present disclosure is directed to a method for controlling a power converter of an electrical power system connected to an electrical grid. The electrical power system has a generator and the power converter has a rotor-side converter and a line-side converter. The method includes monitoring an electrical parameter of at least one of the wind turbine power system or the electrical grid. In response to detecting a transient event in the electrical grid, the method includes temporarily disabling gating of switching elements of the line-side converter of the power converter. Either during the transient event or after the transient event is over, the method includes implementing a control action for the line-side converter of the power converter. Further, the method includes enabling the line-side converter of the power converter to the electrical grid.

In yet another aspect, the present disclosure is directed a wind turbine power system connected to an electrical grid. The wind turbine power system includes a generator having a rotor and a stator and a power converter electrically coupled to the generator. The power converter includes a rotor-side converter and a line-side converter. The wind turbine power system also includes a turbine controller configured for performing a plurality of operations, including but not limited to monitoring an electrical parameter of at least one of the wind turbine power system or the electrical grid, in response to detecting a transient event in the electrical grid, temporarily disabling the line-side converter of the power converter from the electrical grid, either during the transient event or after the transient event is over, implementing a control action for the line-side converter of the power converter, and enabling the line-side converter of the power converter to the electrical grid. It should be understood that the methods and wind turbine power systems may further include any combination of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
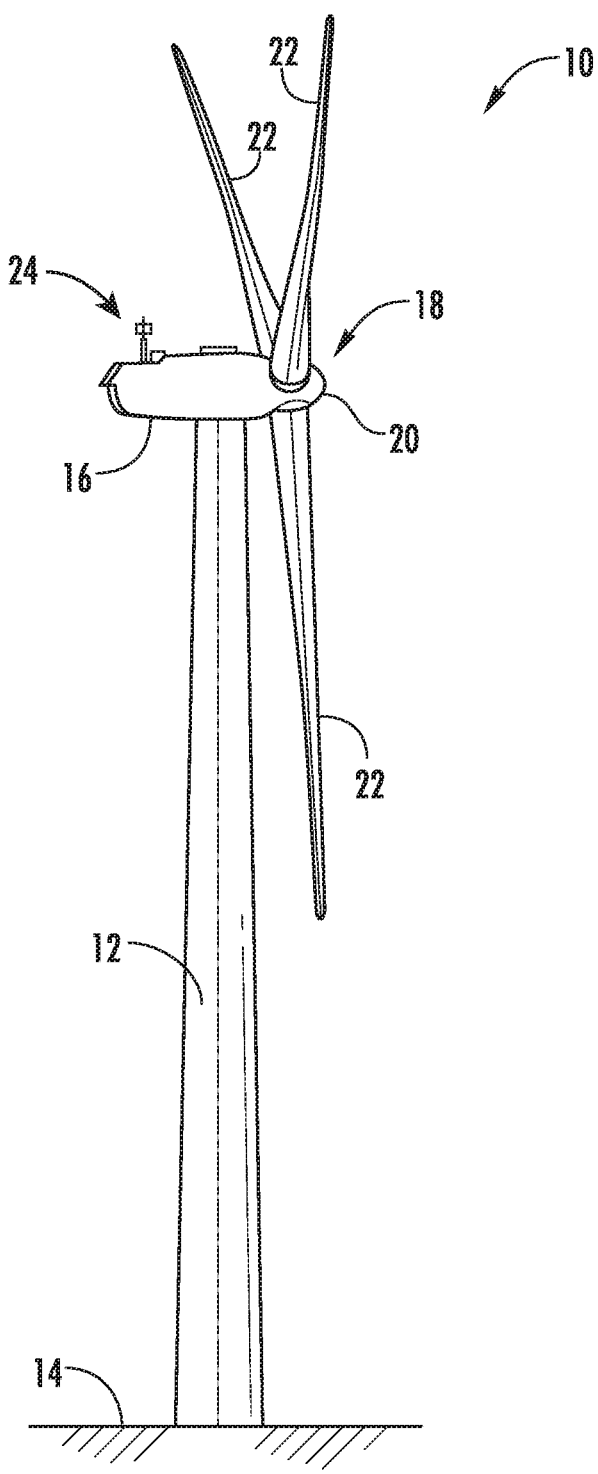
FIG. 1 illustrates a perspective view of an embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for controlling a wind turbine converter during a high voltage ride through (HVRT) event. More particularly, the system and method of the present disclosure provides for momentarily turning off the line bridge circuit in response to large grid disturbances. Such action allows the wind turbine to satisfy phase-jump ride-thru requirements and to handle HVRT events. For example, in an embodiment, the controller is configured to turn off or disable IGBT gating of the line side power bridge upon detection of a HVRT event, determine the nature of the disturbance in the immediate time frame (i.e. within a couple of milliseconds), and then implement an appropriate action. In particular, the controller may resume gating with plus or minus a certain needed current (Iy) and/or may adjust the phase-locked loop angle before resuming gating. After the appropriate action is taken to overset any potential damage and the HVRT event passes, the controller may resume IGBT gating.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, as will be described below, the rotor 18 may be rotatably coupled to an electric generator 120 (FIG. 2) for production of electrical energy. One or more wind conditions, such as wind speed and/or wind direction may also be monitored via a wind sensor 24, such as an anemometer, located on the nacelle 16 or any other suitable location near the wind turbine 10.

Wind power generation is typically provided by a wind farm having a large number (often 100 or more) of the wind turbines 10 with associated wind turbine generators 120 (FIG. 2), wherein each individual wind turbine 10 typically experiences a unique wind force. Accordingly, the output power for each individual wind turbine generator 120 may vary from one wind turbine 10 to another wind turbine 10 within the wind farm.

Figure 2:
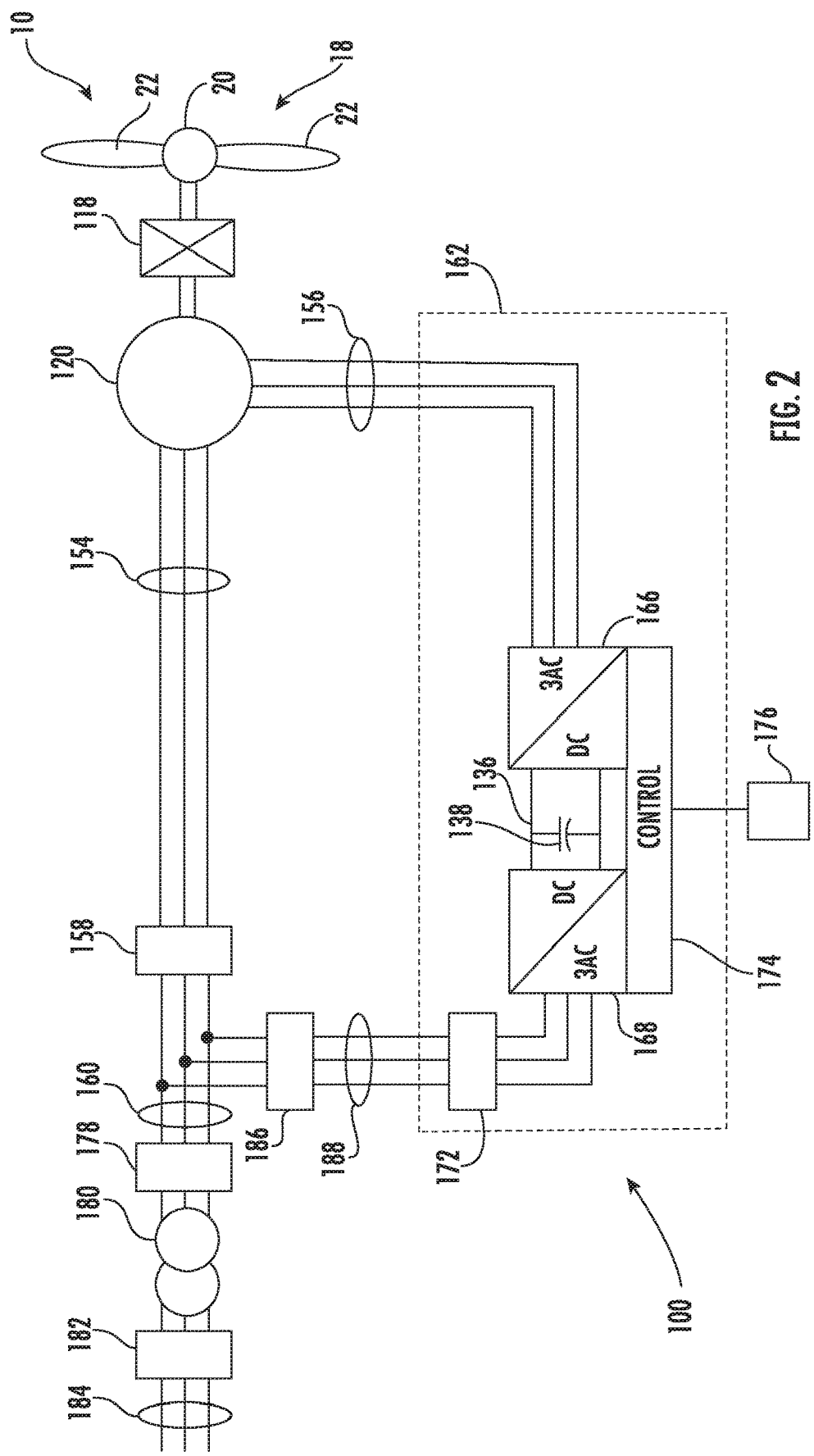
FIG. 2 illustrates a schematic view of one embodiment of a wind turbine electrical power system suitable for use with the wind turbine shown in FIG. 1.

Referring now to FIG. 2, a schematic diagram of one embodiment of a wind turbine DFIG power system 100 ("wind turbine system") is illustrated in accordance with aspects of the present disclosure. Although the present disclosure will generally be described herein with reference to the system 100 shown in FIG. 2, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 2, the rotor 18 of the wind turbine 10 (FIG. 1) may, optionally, be coupled to a gearbox 118, which is, in turn, coupled to the generator 120, which may be a doubly fed induction generator (DFIG). As shown, the DFIG 120 may be connected to a stator bus 154. Further, as shown, a power converter 162 may be connected to the DFIG 120 via a rotor bus 156, and to the stator bus 154 via a line side bus 188. As such, the stator bus 154 may provide an output multiphase power (e.g. three-phase power) from a stator of the DFIG 120, and the rotor bus 156 may provide an output multiphase power (e.g. three-phase power) from a rotor of the DFIG 120. The power converter 162 may also include a rotor-side converter (RSC) 166 and a line-side converter (LSC) 168. The DFIG 120 is coupled via the rotor bus 156 to the rotor-side converter 166. Additionally, the RSC 166 is coupled to the LSC 168 via a DC link 136 across which is a DC link capacitor 138. The LSC 168 is, in turn, coupled to a line side bus 188.

The RSC 166 and the LSC 168 may be configured for normal operating mode in a three-phase, pulse width modulation (PWM) arrangement using insulated gate bipolar transistor (IGBT) switching elements, as will be discussed in more detail with respect to FIG. 3.

In addition, the power converter 162 may be coupled to a controller 174 in order to control the operation of the rotor-side converter 166 and the line-side converter 168. It should be noted that the converter controller 174 may be configured as an interface between the power converter 162 and a local wind turbine control system 176 and may include any number of control devices. In one embodiment, the controller 174 may include a processing device (e.g. microprocessor, microcontroller, etc.) executing computer-readable instructions stored in a computer-readable medium. The instructions when executed by the processing device may cause the processing device to perform operations, including providing control commands (e.g. switching frequency commands) to the switching elements of the power converter 162.

In typical configurations, various line contactors and circuit breakers including, for example, a grid breaker 182 may also be included for isolating the various components as necessary for normal operation of the DFIG 120 during connection to and disconnection from a load, such as the electrical grid 184. For example, a system circuit breaker 178 may couple the system bus 160 to a transformer 180, which may be coupled to the electrical grid 184 via the grid breaker 182. In alternative embodiments, fuses may replace some or all of the circuit breakers.

In operation, alternating current power generated at the DFIG 120 by rotating the rotor 18 is provided to the electrical grid 184 via dual paths defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. As is generally understood, switching elements 192, 194 (e.g. IGBTs) used in the bridge circuits of the rotor side power converter 166 may be modulated to convert the AC power provided from the rotor bus 156 into DC power suitable for the DC link 136.

In addition, the LSC 168 converts the DC power on the DC link 136 into AC output power suitable for the electrical grid 184. In particular, switching elements 196, 198 (e.g. IGBTs) used in bridge circuits of the LSC 168 can be modulated to convert the DC power on the DC link 136 into AC power on the line side bus 188. The AC power from the power converter 162 can be combined with the power from the stator of DFIG 120 to provide multi-phase power (e.g. three-phase power) having a frequency maintained substantially at the frequency of the electrical grid 184 (e.g. 50 Hz or 60 Hz). In certain instances, as mentioned, for an individual DFIG wind turbine power system 100, the reactive power may be supplied primarily by the RSC 166, via the generator 120 and the LSC 168.

Additionally, various circuit breakers and switches, such as grid breaker 182, system breaker 178, stator sync switch 158, converter breaker 186, and line contactor 172 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 162 may receive control signals from, for instance, the local control system 176 (also referred to herein as a turbine controller) via the converter controller 174. The control signals may be based, among other things, on sensed states or operating characteristics of the wind turbine power system 100. Typically, the control signals provide for control of the operation of the power converter 162. For example, feedback in the form of a sensed speed of the DFIG 120 may be used to control the conversion of the output power from the rotor bus 156 to maintain a proper and balanced multi-phase (e.g. three-phase) power supply. Other feedback from other sensors may also be used by the controller 174 or control system 176 to control the power converter 162, including, for example, stator and rotor bus voltages and current feedbacks. Using the various forms of feedback information, switching control signals (e.g. gate timing commands for IGBTs), stator synchronizing control signals, and circuit breaker signals may be generated.

The power converter 162 also compensates or adjusts the frequency of the three-phase power from the rotor for changes, for example, in the wind speed at the hub 20 and the blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 162, and specifically, the bi-directional characteristics of the LSC 168 and RSC 166, facilitate feeding back at least some of the generated electrical power into generator rotor 120. More specifically, electrical power may be transmitted from the stator bus 154 to the line side bus 188 and subsequently through the line contactor 172 and into the power converter 162, specifically the LSC 168 which acts as a rectifier and rectifies the sinusoidal, three-phase AC power to DC power. The DC power is transmitted into the DC link 136. The capacitor 138 facilitates mitigating DC link voltage amplitude variations by facilitating mitigation of a DC ripple sometimes associated with three-phase AC rectification.

The DC power is subsequently transmitted to the RSC 166 that converts the DC electrical power to a three-phase, sinusoidal AC electrical power by adjusting voltages, currents, and frequencies. This conversion is monitored and controlled via the converter controller 174. The converted AC power is transmitted from the RSC 166 via the rotor bus 156 to the generator rotor. In this manner, generator reactive power control is facilitated by controlling rotor current and voltage.

Figure 3:
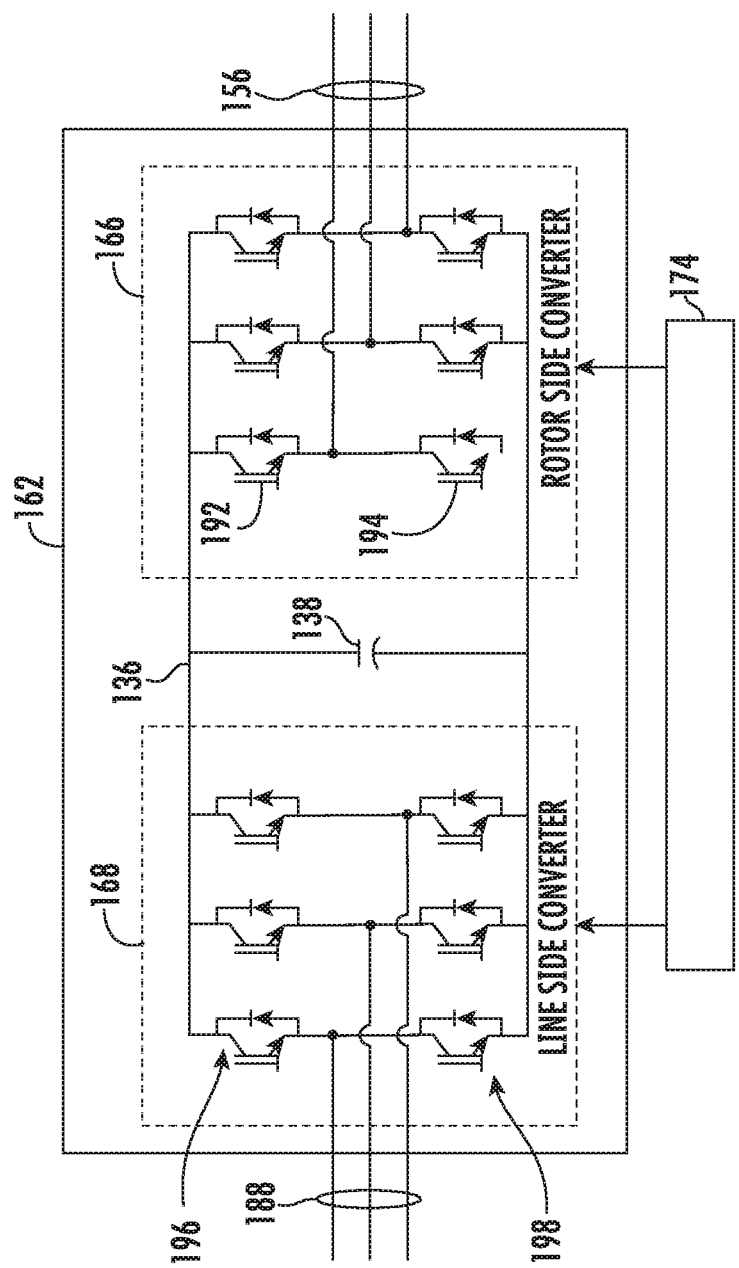
FIG. 3 illustrates a schematic diagram of one embodiment of a power converter of a wind turbine according to the present disclosure.

Referring now to FIG. 3, a detailed, schematic diagram of one embodiment of the power converter 162 shown in FIG. 2 is illustrated in accordance with aspects of the present disclosure. As shown, the RSC 166 includes a plurality of bridge circuits (e.g. H-bridge circuits), with each phase of the rotor bus 156 input to the rotor-side converter 166 being coupled to a single bridge circuit. In addition, the LSC 168 may also include a plurality of bridge circuits. Similar to the rotor-side converter 166, the line-side converter 168 also includes a single bridge circuit for each output phase of the line-side converter 168. In other embodiments, the line-side converter 168, the rotor-side converter 166, or both the line-side converter 168 and the rotor-side converter 166 may include parallel bridge circuits without deviating from the scope of the present disclosure.

Each bridge circuit may generally include pairs of switching elements (e.g. IGBTs 192, 194, 196, 198) coupled in series with one another in a three-phase two-level voltage source converter (VSC) configuration. For instance, as shown in FIG. 3, each bridge circuit of the rotor-side converter includes an upper IGBT (e.g. IGBT 192) and a lower IGBT (e.g. IGBT 194). In addition, a diode may be coupled in parallel with each of the IGBTs. In alternative embodiments, parallel IGBTs and diodes may be used to increase the current rating of the converter. As is generally understood, the line-side converter 168 and the rotor-side converter 166 may be controlled, for instance, by providing control commands, using a suitable driver circuit, to the gates of the respective IGBTs 192, 194, 196, 198. For example, the converter controller 174 may provide suitable gate timing commands to the gates of the IGBTs of the bridge circuits. The control commands may control the switching frequency of the IGBTs to provide a desired output. It should be appreciated by those of ordinary skill in the art that, as an alternative to IGBTs, the power convertor 162 may include any other suitable switching elements.

It should be appreciated that the converter controllers 174, local wind turbine controllers 176, and farm-level controller 190 may each correspond to any suitable computing device and/or any combination of computing devices. For instance, a controller may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller to perform various functions, such as the steps disclosed herein.

Figure 4:
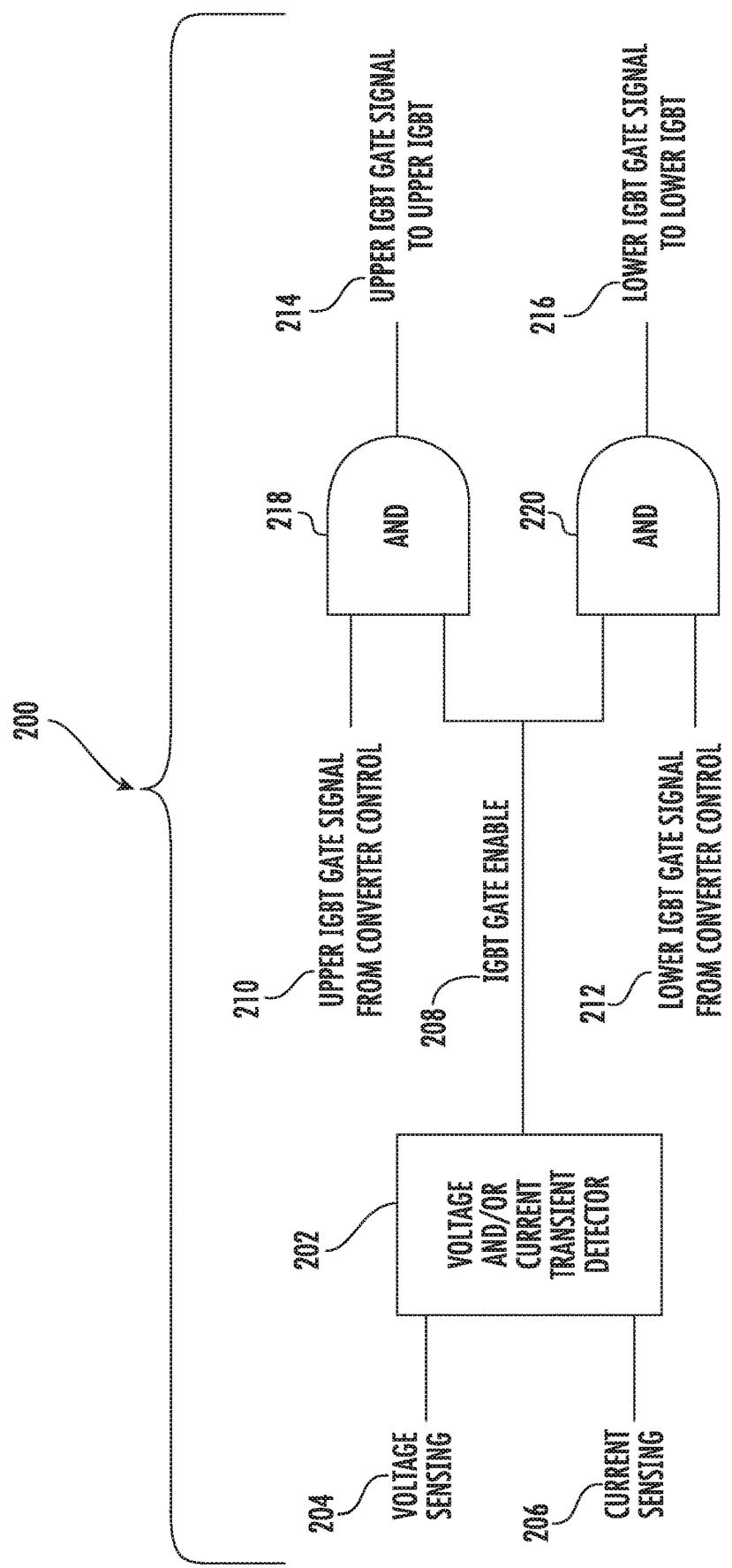
FIG. 4 illustrates a schematic diagram of one embodiment of a system for controlling a power converter of a wind turbine power system connected to an electrical grid according to the present disclosure.
Figure 5:
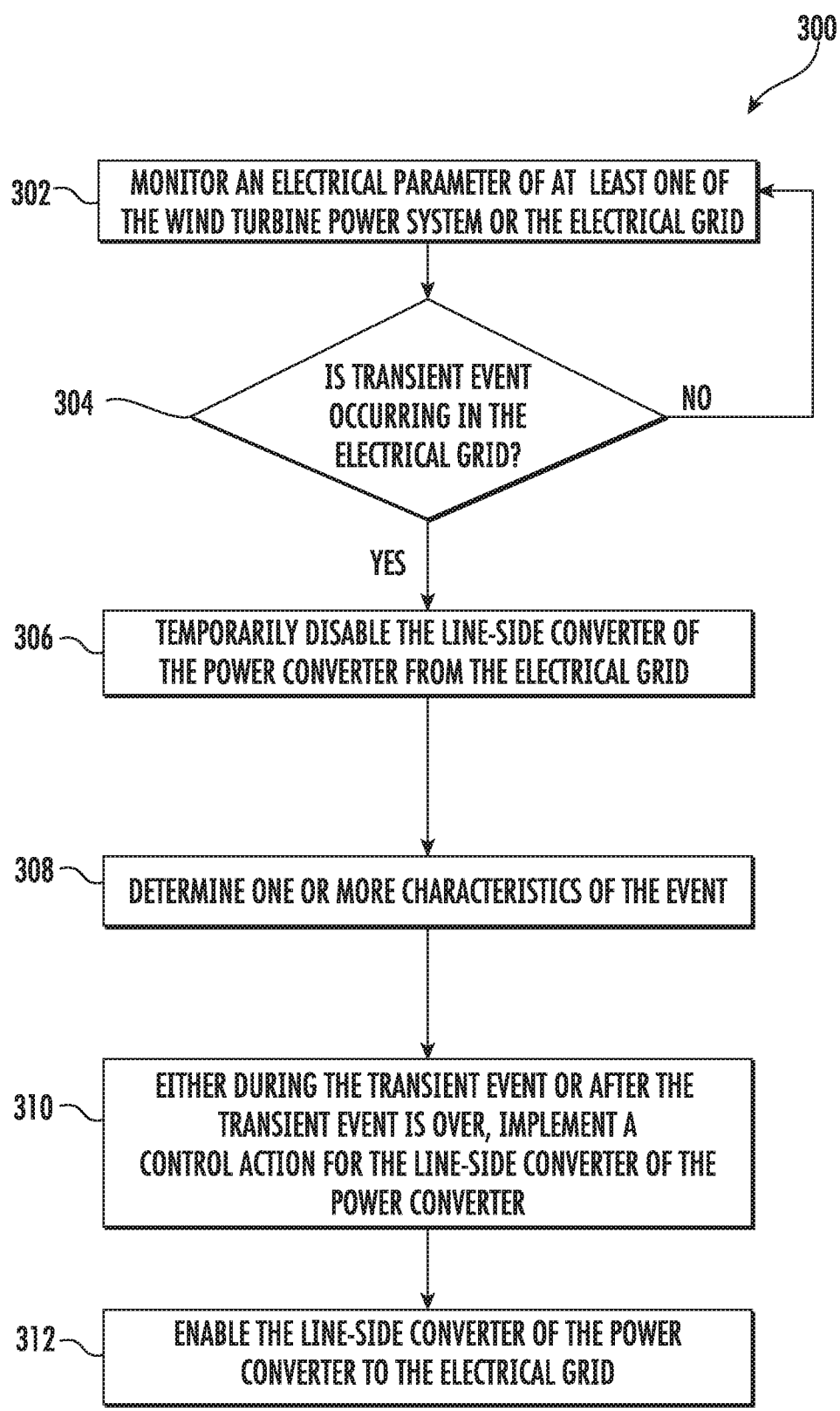
FIG. 5 illustrates a flow diagram of one embodiment of a method for controlling a power converter of a wind turbine power system connected to an electrical grid according to the present disclosure.

Referring now to FIGS. 4 and 5, a system 200 and method 300 for controlling a power converter of a wind turbine power system connected to an electrical grid according to the present disclosure are illustrated. FIG. 4 illustrates a schematic diagram of one embodiment of a system 200 for controlling a power converter of a wind turbine power system connected to an electrical grid according to the present disclosure. FIG. 5 illustrates a flow diagram of an embodiment of a method 300 for controlling a power converter of a wind turbine power system connected to an electrical grid is illustrated in accordance with aspects of the present disclosure. In general, the method 300 is described herein as implemented using, for example, the power converter 162 and the wind turbine power system 100 described above. However, it should be appreciated that the disclosed method 300 may be implemented using any other suitable wind power generation system. In addition, although FIG. 5 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (302), the method 300 includes monitoring an electrical parameter of at least one of the wind turbine power system 100 or the electrical grid 184. For example, in an embodiment, the electrical parameter of the wind turbine power system 100 and/or the electrical grid 184 may include voltage, current, or any other suitable electrical parameter of the system 100 or grid 184 or combinations thereof. For example, such electrical parameters may be monitored at the system bus 160 as well as any other suitable location, such as the line side bus 188.

Thus, as shown at (304), the method 300 includes determining whether a transient event is occurring in the electrical grid 184. For example, in an embodiment, the electrical parameter, such as the grid voltage, may be compared to a certain threshold to determine whether a transient event is occurring. In such embodiments, the threshold may be set, as an example, by a utility company. In certain embodiments, for example, the transient event may be a high voltage ride through (HVRT) event. Accordingly, the transient event may be characterized by the grid voltage increasing above the threshold.

In response to detecting the transient event in the electrical grid 184 (e.g. due to the electrical parameter being above the threshold), as shown at (306), the method 300 includes temporarily disabling the line-side converter 168 of the power converter 162 from the electrical grid 184. For example, in an embodiment, the line-side converter 168 of the power converter 162 may be temporarily disabled from the electrical grid 184 by temporarily disabling gating of the switching elements, e.g. IGBTs, of the line-side converter 168 of the power converter 162. In other words, in certain embodiments, the IGBTs may be temporarily turned off, which results in the anti-parallel diodes still being connected. Those anti-parallel diodes can rectify the voltage peaks and feed energy into the capacitor bank of the DC bus. This actually still allows the IGBTs to clamp the peak voltages, even when the IGBTs have been disabled.

In particular, as shown in FIG. 4, a voltage and/or current transient detector 202 is configured to receive sensor data representative of voltage and/or current sensing 204, 206 and can then generate an IGBT gate enable signal 208. As shown at 210 and 212, respectively, the upper IGBT gate signal from the converter control and the lower IGBT gate signal from the converter control are used in conjunction with the IGBT gate enable signal 208 (as shown at "AND" boxes 218 and 220) to generate the gate signals 214 and 216 from the upper and lower IGBTs. In further embodiments, if needed, the method 300 may also include temporarily disabling the rotor-side converter 166 of the power converter 168 during the transient event in response to detecting the transient event in the electrical grid 184.

Referring back to FIG. 5, in an embodiment, as shown at (308), the method 300 may also include determining one or more characteristics of the HVRT event. For example, the characteristic(s) of the HVRT event may include a voltage or current magnitude, a grid characteristic, grid impedance, grid strength, a duration of the HVRT event, and/or combinations thereof.

Either during the transient event or after the transient event is over, as shown at (310), the method 300 includes implementing a control action for the line-side converter 168 of the power converter 162. As shown at (312), the method 300 includes enabling the line-side converter 168 of the power converter 162 to the electrical grid 184. For example, in an embodiment, the method 200 may include determining the control action based on the characteristic(s) of the HVRT event. More specifically, in an embodiment, the control action may include adjusting a current of the line-side converter of the power converter, adjusting a phase-locked loop angle of the line-side converter of the power converter, or any other control action. Accordingly, in certain embodiments, such control actions may be implemented before enabling the line-side converter 168 of the power converter 162 to the electrical grid 184.

Various aspects and embodiments of the present invention are defined by the following numbered clauses:

Clause 1. A method for controlling a power converter of a wind turbine power system connected to an electrical grid, the wind turbine power system having a generator, the power converter having rotor-side converter and a line-side converter, the method comprising:

monitoring an electrical parameter of at least one of the wind turbine power system or the electrical grid;

in response to detecting a transient event in the electrical grid, temporarily disabling the line-side converter of the power converter from the electrical grid;

either during the transient event or after the transient event is over, implementing a control action for the line-side converter of the power converter; and, enabling the line-side converter of the power converter to the electrical grid.

Clause 2. The method of clause 1, wherein the electrical parameter of the electrical grid comprises at least one of voltage or current.

Clause 3. The method of any of the preceding clauses, further comprising temporarily disabling the rotor-side converter of the power converter during the transient event in response to detecting the transient event in the electrical grid.

Clause 4. The method of any of the preceding clauses, wherein temporarily disabling the line-side converter of the power converter from the electrical grid during the transient event further comprises temporarily disabling gating of switching elements of the line-side converter of the power converter via a converter controller.

Clause 5. The method of any of the preceding clauses, wherein the transient event comprises a high voltage ride through (HVRT) event.

Clause 6. The method of clause 5, further comprising determining one or more characteristics of the HVRT event, the one or more characteristics comprising at least one a voltage or current magnitude, a grid characteristic, grid impedance, grid strength, or duration of the HVRT event.

Clause 7. The method of clause 6, further comprising determining the control action based on the one or more characteristics of the HVRT event.

Clause 8. The method of clause 7, wherein the control action further comprises at least one of adjusting a current of the line-side converter of the power converter or adjusting a phase-locked loop angle of the line-side converter of the power converter.

Clause 9. The method of clause 8, further comprising adjusting the current of the line-side converter of the power converter or adjusting the phase-locked loop angle of the line-side converter of the power converter before enabling the line-side converter of the power converter to the electrical grid. posted Clause 10. The method of any of the preceding clauses, wherein the generator comprises a doubly fed induction generator (DFIG).

Clause 11. A method for controlling a power converter of an electrical power system connected to an electrical grid, the electrical power system having a generator, the power converter having rotor-side converter and a line-side converter, the method comprising:

monitoring an electrical parameter of at least one of the wind turbine power system or the electrical grid;

in response to detecting a transient event in the electrical grid, temporarily disabling gating of switching elements of the line-side converter of the power converter;

either during the transient event or after the transient event is over, implementing a control action for the line-side converter of the power converter; and, enabling the line-side converter of the power converter to the electrical grid.

Clause 12. A wind turbine power system connected to an electrical grid, the wind turbine power system comprising:

a generator comprising a rotor and a stator;

a power converter electrically coupled to the generator, the power converter comprising a rotor-side converter and a line-side converter; and a turbine controller configured for performing a plurality of operations, the plurality of operations comprising:

monitoring an electrical parameter of at least one of the wind turbine power system or the electrical grid;

in response to detecting a transient event in the electrical grid, temporarily disabling the line-side converter of the power converter from the electrical grid;

either during the transient event or after the transient event is over, implementing a control action for the line-side converter of the power converter; and, enabling the line-side converter of the power converter to the electrical grid.

Clause 13. The wind turbine power system of clause 12, wherein the electrical parameter of the electrical grid comprises at least one of voltage or current.

Clause 14. The wind turbine power system of clauses 12-13, further comprising temporarily disabling the rotor-side converter of the power converter during the transient event in response to detecting the transient event in the electrical grid.

Clause 15. The wind turbine power system of clauses 12-14, wherein temporarily disabling the line-side converter of the power converter during the transient event further comprises temporarily disabling gating of switching elements of the line-side converter of the power converter.

Clause 16. The wind turbine power system of clause 15, wherein the switching elements comprise insulated-gate bipolar transistors (IGBTs).

Clause 17. The wind turbine power system of clause 16, wherein the transient event comprises a high voltage ride through (HVRT) event.

Clause 18. The wind turbine power system of clause 17, further comprising:

determining one or more characteristics of the HVRT event, the one or more characteristics comprising at least one a voltage or current magnitude, a grid characteristic, grid impedance, grid strength, or duration of the HVRT event; and, determining the control action based on the one or more characteristics of the HVRT event.

Clause 19. The wind turbine power system of clause 18, wherein the control action further comprises at least one of adjusting a current of the line-side converter of the power converter or a phase-locked loop angle of the line-side converter of the power converter.

Clause 20. The wind turbine power system of clauses 12-19, wherein the generator comprises a doubly fed induction generator (DFIG).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a power converter of a wind turbine power system connected to an electrical grid, the wind turbine power system having a generator, the power converter having rotor-side converter and a line-side converter, the method comprising:

monitoring an electrical parameter of at least one of the wind turbine power system or the electrical grid;

in response to detecting a transient event in the electrical grid, temporarily disabling the line-side converter of the power converter from the electrical grid, the transient event comprising a high voltage ride through (HVRT) event;

determining one or more characteristics of the HVRT event, the one or more characteristics comprising at least one of a voltage or current magnitude, a grid characteristic, grid impedance, grid strength, or duration of the HVRT event;

determining a control action based on the one or more characteristics of the HVRT event;

during the transient event, implementing the control action for the line-side converter of the power converter; and, enabling the line-side converter of the power converter to the electrical grid.

2. The method of claim 1, wherein the electrical parameter of the electrical grid comprises at least one of voltage or current.

3. The method of claim 1, further comprising temporarily disabling the rotor-side converter of the power converter during the transient event in response to detecting the transient event in the electrical grid.

4. The method of claim 1, wherein temporarily disabling the line-side converter of the power converter from the electrical grid during the transient event further comprises temporarily disabling gating of switching elements of the line-side converter of the power converter via a converter controller.

5. The method of claim 1, wherein the control action further comprises at least one of adjusting a current of the line-side converter of the power converter or adjusting a phase-locked loop angle of the line-side converter of the power converter.

6. The method of claim 5, further comprising adjusting the current of the line-side converter of the power converter or adjusting the phase-locked loop angle of the line-side converter of the power converter before enabling the line-side converter of the power converter to the electrical grid.

7. The method of claim 1, wherein the generator comprises a doubly fed induction generator (DFIG).

8. A method for controlling a power converter of an electrical power system connected to an electrical grid, the electrical power system having a generator, the power converter having rotor-side converter and a line-side converter, the method comprising:

monitoring an electrical parameter of at least one of the wind turbine power system or the electrical grid;

in response to detecting a transient event in the electrical grid, temporarily disabling gating of switching elements of the line-side converter of the power converter, the transient event comprising a high voltage ride through (HVRT) event;

determining one or more characteristics of the HVRT event, the one or more characteristics comprising at least one a voltage or current magnitude, a grid characteristic, grid impedance, grid strength, or duration of the HVRT event;

determining a control action based on the one or more characteristics of the HVRT event;

during the transient event, implementing the control action for the line-side converter of the power converter; and, enabling the line-side converter of the power converter to the electrical grid.

9. A wind turbine power system connected to an electrical grid, the wind turbine power system comprising:

a generator comprising a rotor and a stator;

a power converter electrically coupled to the generator, the power converter comprising a rotor-side converter and a line-side converter; and a turbine controller configured for performing a plurality of operations, the plurality of operations comprising:

monitoring an electrical parameter of at least one of the wind turbine power system or the electrical grid;

in response to detecting a transient event in the electrical grid, temporarily disabling the line-side converter of the power converter from the electrical grid, the transient event comprising a high voltage ride through (HVRT) event;

determining one or more characteristics of the HVRT event, the one or more characteristics comprising at least one a voltage or current magnitude, a grid characteristic, grid impedance, grid strength, or duration of the HVRT event;

determining a control action based on the one or more characteristics of the HVRT event;

during the transient event, implementing the control action for the line-side converter of the power converter; and, enabling the line-side converter of the power converter to the electrical grid.

10. The wind turbine power system of claim 9, wherein the electrical parameter of the electrical grid comprises at least one of voltage or current.

11. The wind turbine power system of claim 9, further comprising temporarily disabling the rotor-side converter of the power converter during the transient event in response to detecting the transient event in the electrical grid.

12. The wind turbine power system of claim 9, wherein temporarily disabling the line-side converter of the power converter during the transient event further comprises temporarily disabling gating of switching elements of the line-side converter of the power converter.

13. The wind turbine power system of claim 12, wherein the switching elements comprise insulated-gate bipolar transistors (IGBTs).

14. The wind turbine power system of claim 9, wherein the control action further comprises at least one of adjusting a current of the line-side converter of the power converter or a phase-locked loop angle of the line-side converter of the power converter.

15. The wind turbine power system of claim 9, wherein the generator comprises a doubly fed induction generator (DFIG).

\* \* \* \* \*